United States Patent
Field et al.

(10) Patent No.: US 7,690,231 B1
(45) Date of Patent: Apr. 6, 2010

(54) ELECTROMECHANICAL CYLINDER LOCK

(75) Inventors: Peter Field, Salem, VA (US); Duncan Kerr, San Francisco, CA (US)

(73) Assignee: Medeco Security Lock, Inc., Salem, VA (US)

( * ) Notice: Subject to any disclaimer, the term of this patent is extended or adjusted under 35 U.S.C. 154(b) by 0 days.

(21) Appl. No.: 08/800,742

(22) Filed: Feb. 14, 1997

(51) Int. Cl.
    *E05B 47/06* (2006.01)
(52) U.S. Cl. .......................... 70/283; 70/278.3; 70/495; 70/372; 70/375; 70/1.5; 292/DIG. 66
(58) Field of Classification Search .......... 292/DIG. 66; 70/278, 283, 494–496, 1.5, 1.7, 372, 375, 70/DIG. 10, 278.1–278.3, 278.7
    See application file for complete search history.

(56) References Cited

U.S. PATENT DOCUMENTS

| | | | | |
|---|---|---|---|---|
| 3,455,130 A | * | 7/1969 | Basseches | 70/495 |
| 4,485,648 A | * | 12/1984 | Rabinow | 70/495 |
| 4,638,651 A | * | 1/1987 | Surko, Jr. | 70/495 |
| 4,753,465 A | * | 6/1988 | Dalby | 292/DIG. 66 |
| 4,811,564 A | * | 3/1989 | Palmer | 60/527 |
| 4,869,085 A | * | 9/1989 | Meissner | 70/409 |
| 5,351,042 A | * | 9/1994 | Aston | 70/283 |
| 5,542,274 A | * | 8/1996 | Thordmark et al. | 70/496 |
| 5,552,777 A | * | 9/1996 | Gokcebay et al. | 70/278 |
| 5,839,307 A | * | 11/1998 | Field et al. | 70/283 |
| 6,564,601 B2 | * | 5/2003 | Hyatt, Jr. | 70/278.3 |

* cited by examiner

*Primary Examiner*—Suzanne D Barrett
(74) *Attorney, Agent, or Firm*—Rothwell, Figg, Ernst & Manbeck pc (57) ABSTRACT

An electromechanical cylinder lock includes an outer lock shell and a rotatable lock barrel located therein which is controlled by dual locking features. A side bar or fence selectively blocks and permits rotation of the barrel with respect to the shell in response to insertion of a key into a keyway in the barrel. A slider bar is movable between a blocking position in which the side bar is prevented from permitting rotation of the barrel, and an unblocking position in which the side bar permits rotation of the barrel. Alternately, a blocking mechanism is provided to block motion of tumbler pins in the cylinder lock. A shape memory alloy actuator, such as a wire made of NITINOL disposed in the barrel is activated by an electric current in response to determination by an electronic control device whether an attempt to open the lock is authorized. Thermal interlock protection from external heating of the lock is also provided.

16 Claims, 12 Drawing Sheets

ELECTROMECHANICAL CYLINDER LOCK

BACKGROUND OF THE INVENTION

1. Field of the Invention

The present invention relates generally to an electromechanical cylinder lock and, in particular, to a cylinder lock in which an electrical actuator is employed to provide access to the lock cylinder.

2. Description of Related Art

Electromechanical locking devices are known which include electrically interfaced or controlled release mechanisms for operating a lock cylinder. For example, U.S. Pat. No. 4,712,398 discloses an electronic locking system comprising a lock cylinder with a rotatable plug located therein. An electronically activated release assembly is provided which selectively disengages a locking pin from the plug to allow turning of the key to rotate the plug relative to the cylinder. The lock cylinder and key each include an electronic memory device containing keying system codes. Upon insertion of the key the release mechanism disengages the locking pin from the plug to allow its rotation. U.S. Pat. No. 5,552,777 discloses another type of electromechanical cylinder lock having a blocking pin and an electromagnetic solenoid in the cylinder plug. The blocking pin extends into a recess in the cylinder shell, and is retracted upon actuation of the solenoid by a microprocessor in the key.

One benefit of including electronic control features in locks is the ability to provide increased keying codes for operating the lock. For example, information can be stored in the lock and/or key such that the locking mechanism is activated in response to detecting and/or exchanging data. As the information stored in the components may be altered, it is possible to vary the keying codes without changing the system hardware. In contrast, changing the mechanical keying codes in a purely mechanical lock typically requires forming a new key with different bitting surfaces, a more involved process than reprogramming electronic components of an electromechanical lock.

Despite progress made in the development of prior art electromechanical locking systems, several deficiencies exist which leave room for improvement. For example, prior art systems do not provide the ability to retrofit a purely mechanical lock to form an electromechanical lock which is operated at least in part by information stored in a key and/or lock cylinder. The benefits of retrofitting a mechanical lock in this manner include preventing the need to alter the keying of the lock should it become necessary to change the combination, for example when an employee loses his or her key or leaves an establishment. In such a case, the components of the lock may be reprogrammed to change the keying codes to prevent the employee's key from operating the lock. Additionally, prior art systems using electromagnetic components such as solenoids have been found to be impractical, because of the small space available and the relatively large size of components needed to develop enough force to release the blocking mechanism. Accordingly, there remains a need in the art for an improved electromechanical cylinder lock system.

SUMMARY OF THE INVENTION

The present invention provides an electromechanical cylinder lock having at least one, and preferably dual locking features. The lock includes an outer shell or cylinder member, a plug or barrel rotatably mounted within the shell, and a plurality of tumbler pins which are lifted to a shear line of the barrel and shell to operate the lock. A side bar or fence member is provided and cooperates between the shell and barrel to selectively block or permit rotation of the barrel. The side bar has an outer edge located in a recess formed in the shell and is spring biased toward the recess. In a blocked position, the side bar prevents rotation of the barrel. To permit rotation of the barrel, the side bar is moved out of the cavity and toward the barrel by a camming action in order to permit rotation of the barrel. The side bar is prevented from being cammed by a slider bar positioned against the side bar. When an authorized key is inserted into the lock, a controller device in the lock activates an actuator mechanism to move the slider bar to a position over a recess in the side bar, thus allowing the side bar to be cammed into the barrel by rotation of the barrel.

The controller device, for example a microprocessor located within or outside the barrel, has data stored therein including authorized codes for operating the lock. The control device compares data read or detected from the user's key with the stored data to determine whether the actuator mechanism should be activated to move the slider bar to an unblocking position with respect to the side bar. The lock cylinder can include a keyway and a plurality of tumbler pins, the keyway receiving a key which is bitted to position the pins at a shear line which permits the barrel to be rotated.

Alternatively, the locking mechanism may be of a type which does not utilize tumbler pins. The key is provided with means for storing data, for example, a microchip, magnetic data-encoded strip, and the like, such that upon insertion into the keyway the controller device compares data transmitted by the key to determine whether the attempt to operate the lock is authorized, and if so, activates the actuator mechanism to move the slider bar to an unblocking position.

In a preferred embodiment, the actuator mechanism includes a length of shape memory alloy material (one example of which is nitinol wire) attached to the slider bar and electrically coupled to the controller device. Shape memory alloy is a material which can be set to deform when heated. For example, a length of nitinol wire may be formed such that upon heating, such as by passing a small amount of current through the nitinol wire, the wire will contract, causing the slider bar to be moved to the unblocking position, allowing the side bar to be cammed by rotation of the cylinder barrel.

An important benefit of the invention resides in the fact that the side bar, slider bar and electrically powered actuator device are entirely (or substantially entirely) contained within the barrel. This permits the entire barrel to be removed and placed in the outer shells of different lock cylinders. The invention permits the barrel to be substituted for the barrel of a purely mechanical cylinder lock to retrofit the lock into an electromechanical lock system. In addition, the invention contemplates utilizing different but interchangeable electromechanical barrels with a plurality of lock cylinders in a lock system. Moreover, the compact, removable barrel may carry some or all of the electronic hardware, firmware and/or software associated with the lock to provide even greater flexibility in various applications.

According to another aspect of the present invention, a thermal interlock mechanism is provided to prevent attempts at circumventing a heat-actuated lock release through external heating of the lock, by disabling the lock upon such external heating.

BRIEF DESCRIPTION OF THE DRAWINGS

Other objects, features and benefits of the invention will become apparent from the detailed description of preferred embodiments set forth below, taken in conjunction with the accompanying drawing figures, wherein.

DETAILED DESCRIPTION OF THE PREFERRED EMBODIMENTS

Figure 1:
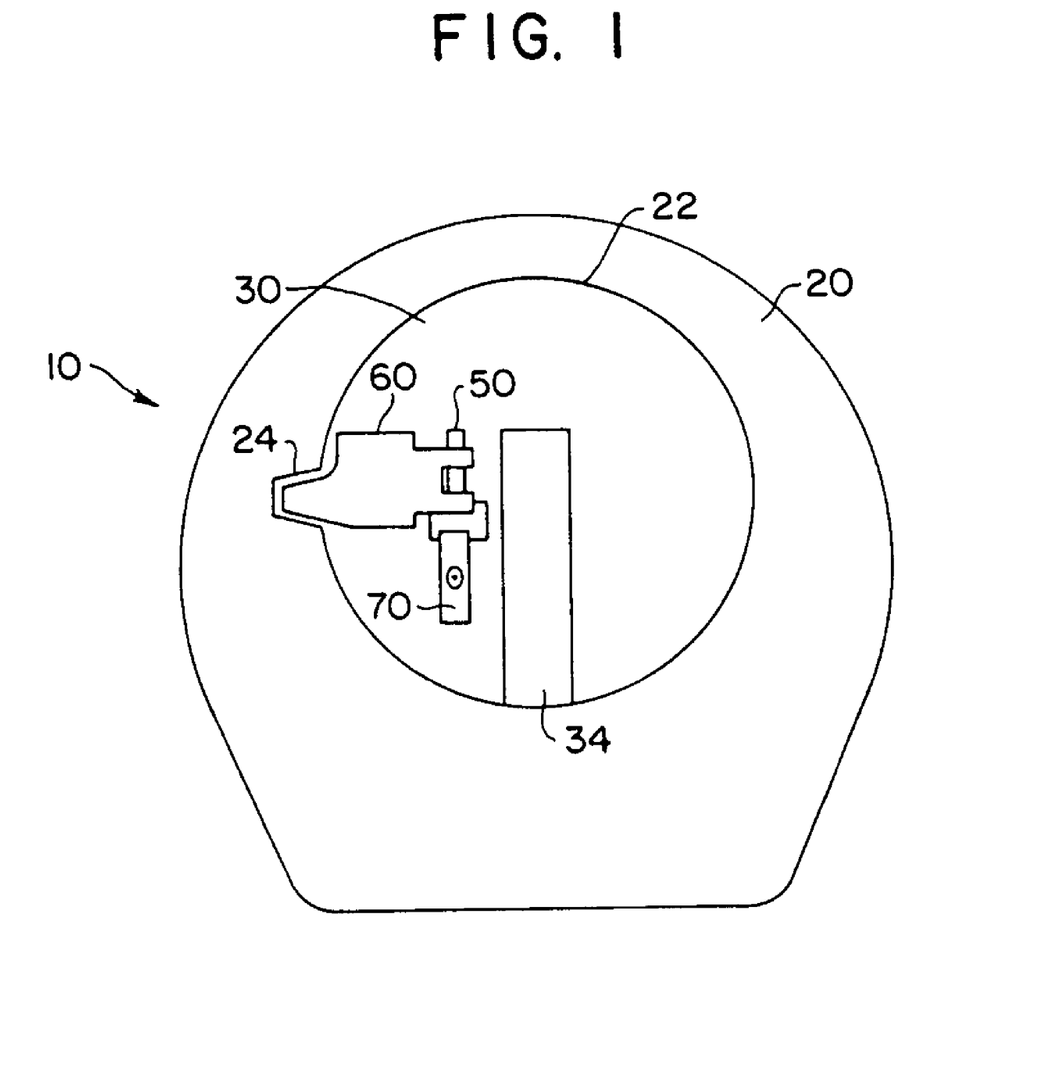
FIG. 1 is a rear elevation view in section of a lock cylinder including a shell, a rotatable plug containing movable locking members, and a side bar constructed according to one embodiment of the present invention, the movable locking members and side bar being oriented in a cylinder locking position.

With reference to FIG. 1, a first embodiment of the present invention is indicated generally by the reference numeral 10 and includes a cylinder or outer shell 20 having a bore 22 in which is positioned a rotatable barrel or plug 30. The barrel 30 has an outer surface substantially corresponding to the bore 22 of the shell and includes a keyway 34 configured to receive a key as is known in the art. The barrel 30 includes a plurality of tumbler pin bores which receive tumbler pins (not shown) as is known in the art. The manner in which a properly bitted key (not shown) engages the tumbler pins and positions them at a shear line to permit the barrel 30 to be rotated with respect to the shell 20 is known in the art and thus will not be described in any great detail herein. However, it should be noted that the tumbler pins may be simply lifted by the bitting surfaces on the key, or they may be lifted rotatively by a key including skew cut bitting surfaces, such as that used with a Medeco®-type cylinder lock, such as disclosed in U.S. Pat. No. 4,732,022, incorporated herein by reference in its entirety.

The shell 20 includes a cavity 24 in which is positioned a side bar or fence 60 which cooperates with the barrel 30 to either block or permit rotation of the barrel within the shell. As discussed below, the upper wall of the cavity 24 is formed as a camming surface for moving the side bar out of the barrel upon rotation of the barrel. As can be seen in FIG. 1, the side bar is received in cavity 24 and its inner edge extends beyond the internal surface of shell bore 22 and engages the barrel 30 to prevent the barrel from rotating to operate the lock. However, when the slider bar 50 is moved to the unblocking position shown in FIG. 3B, the barrel may be rotated to cam side bar 60 out of cavity 24 so as to clear the inner surface of bore 22 and permit rotation of the barrel 30 with respect to the shell 20.

As described in the '022 patent, one or more side bar springs (not shown) may be positioned between the inner edge of the side bar 60 and the barrel. The springs bias the side bar into cavity 24, and the slider bar 50 blocks the side bar from being cammed and thereby prevents the barrel from rotating.

Figure 2:
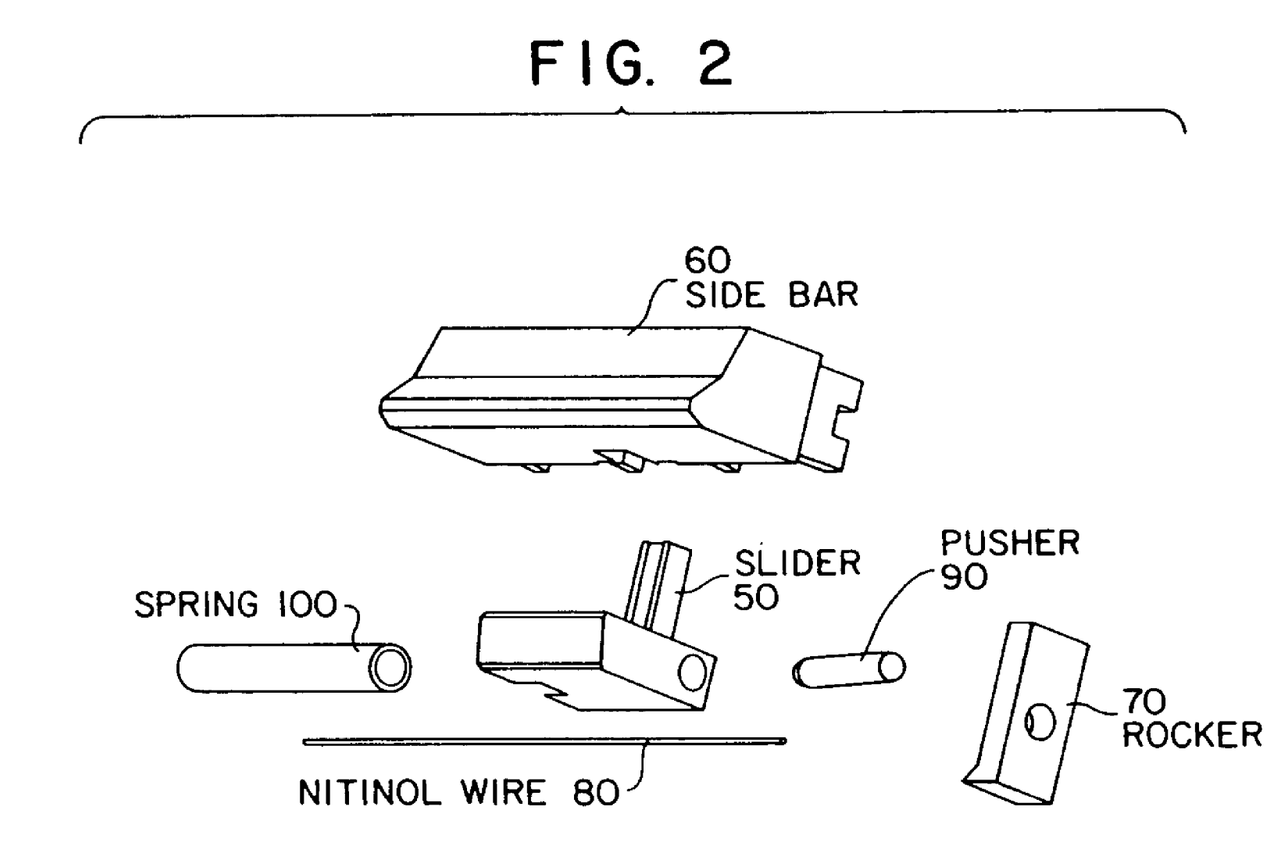
FIG. 2 is an exploded view of the side bar locking mechanism assembly according to a first embodiment of the present invention.

FIG. 2 is an exploded view of a side bar assembly according to a first embodiment of the present invention. The assembly includes side bar 60, and an actuator device including a slider bar 50, a rocker 70, a shape memory alloy wire 80, a pusher 90, and a spring 100.

In one preferred embodiment, the shape memory alloy wire 80 is made of NITINOL. NITINOL is a shape memory alloy material (made of a NiTi alloy) which undergoes a crystalline phase change when heated, causing it to contract or to expand, depending on whether the material is pre-stressed to be in a compressed state or a stretched state. The phase change occurs almost instantaneously at a specific temperature, which can be specified in commercial grades of nitinol wire. Nitinol wire is commercially available, for example from Dynalloy, Inc. under the trade name Flexinol.

While the use of NITINOL is described hereinafter as the shape memory alloy material for purposes of illustration of a preferred embodiment of the invention, it will be noted that the present invention is not limited to the use of NITINOL, but may be implemented by using any other appropriately suitable material.

Examples of other known shape memory alloy materials include Cu—Al—Ni, Fe—Mn—Si—Cr—Ni, and Cu50-Zr50. Shape memory alloy materials are also commercially available from Shape Memory Applications, Inc., Santa Clara, Calif.

Figure 3A:
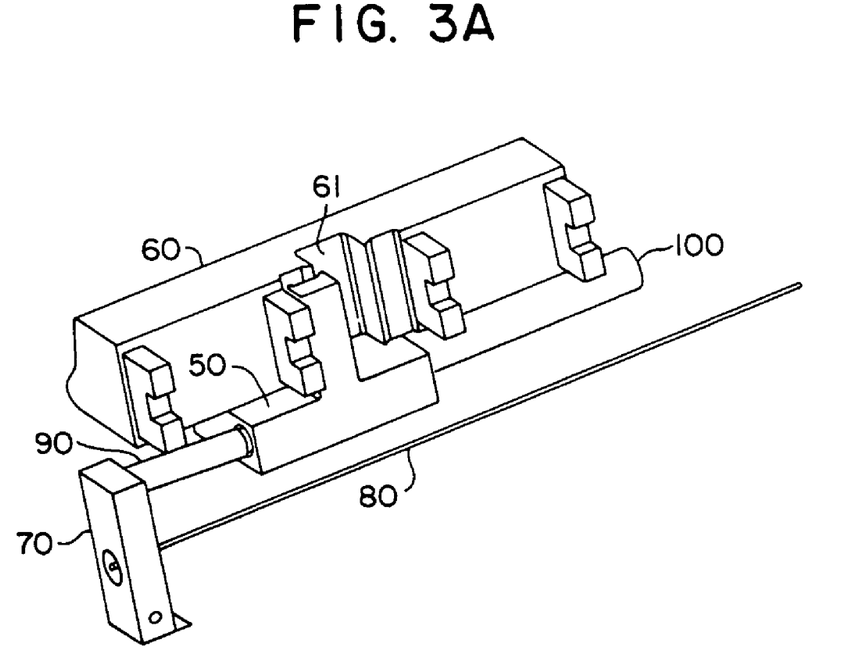
FIGS. 3A and 3B are three dimensional views of the side bar assembly according to the first embodiment of the present invention, in a locked and unlocked position, respectively.
Figure 3B:
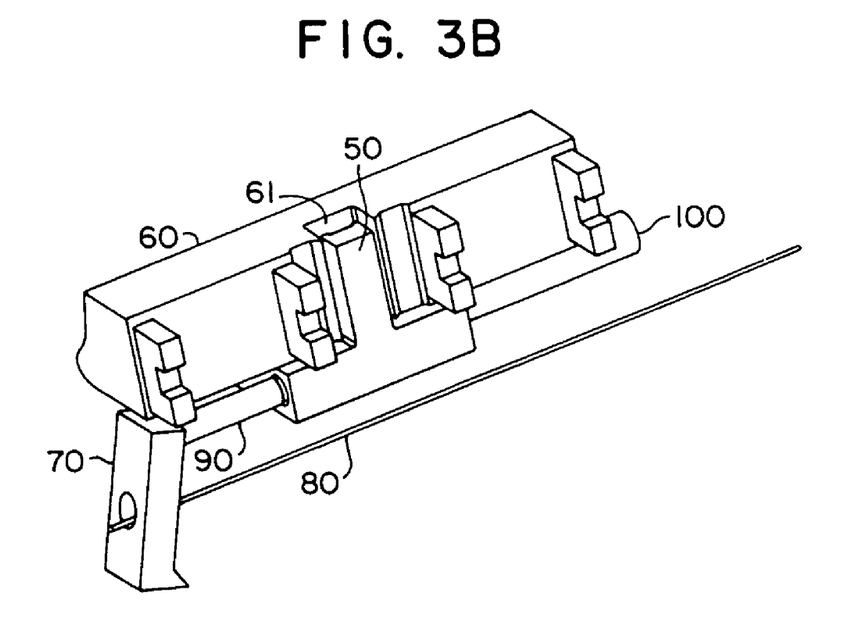

As shown in FIG. 3A, the slider bar 50 is normally biased by spring 100 in a blocking position with respect to side bar 60, such that the side bar cannot be cammed out of the cavity 24 in the shell and thus preventing rotation of the barrel. As shown in FIG. 3B, upon activation of the nitinol wire 80, by passing a predetermined amount of electric current through it, the wire 80 will contract, pulling rocker 70 against pusher 90, which pushes slider bar 50 against the force of spring 100 to a position over a recess 61 in the side bar 60. As such, the side bar 60 may be cammed into the barrel by rotation of the barrel, allowing the lock to be opened.

Preferred specifications for nitinol actuator wire to perform 100,000+ cycles are as follows:

| | |
|---|---|
| maximum strain | 4% |
| maximum contraction stress | ~25,000 psi |
| biasing stress | ~5,000 to 10,000 psi |
| transition temperature | 60 to 110° C. |

It is possible to over stress the wire if it is heated too quickly and is subjected to a high inertial load when it starts to contract. The wire also can be overstressed if it is prevented from contracting to its full strain point while being heated to its transition temperature. Appropriate design considerations can eliminate these possibilities.

Figure 6:
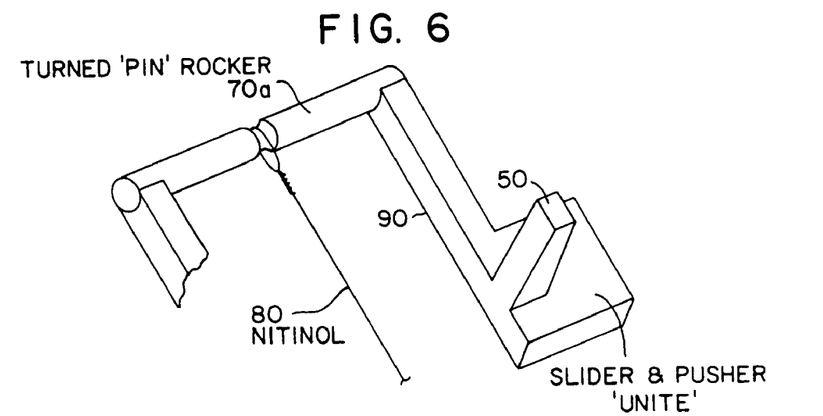
FIGS. 6-9 are three dimensional views of various configurations of pusher and rocker mechanisms for the slider bar actuator device of the present invention.
Figure 7A:
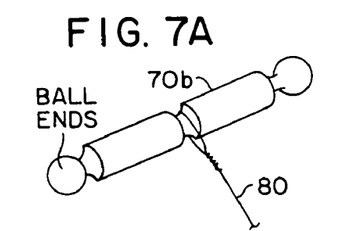
Figure 7B:
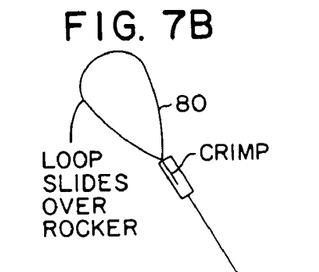
Figure 8:
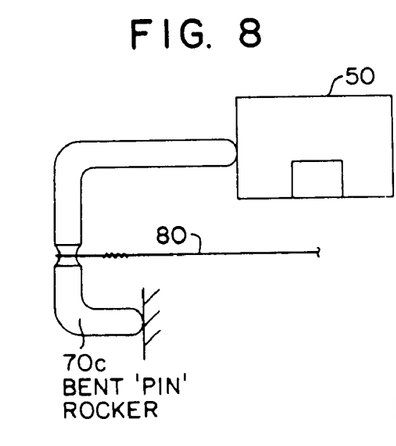
Figure 9:
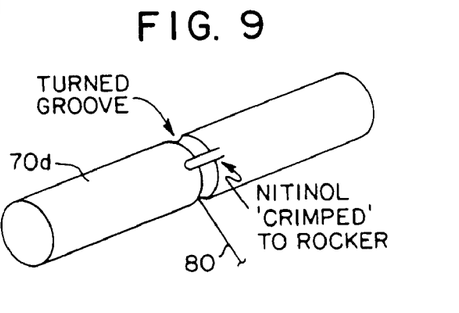

The rocker and pusher components provide a lever arm arrangement which serves to provide the appropriate amount of displacement of the slider bar in response to the maximum tolerable contraction strain on the length of nitinol wire available for use in a typical cylinder barrel volume. Some possible variations on the design of the rocker and pusher components are shown in FIGS. 6-9. As shown in FIG. 6, rocker 70a has a groove for accommodating the nitinol wire 80 (formed into a crimped loop as shown in FIG. 7B). The rocker 70a abuts against an integral slider and pusher element. FIG. 7A shows a rocker 70b having ball-shaped ends for facilitated motion. FIG. 8 shows a "bent pin" rocker configuration 70c, and FIG. 9 illustrates a "turned groove" rocker configuration 70d, wherein the nitinol wire is crimped to the rocker for more secure operation.

Figure 4:
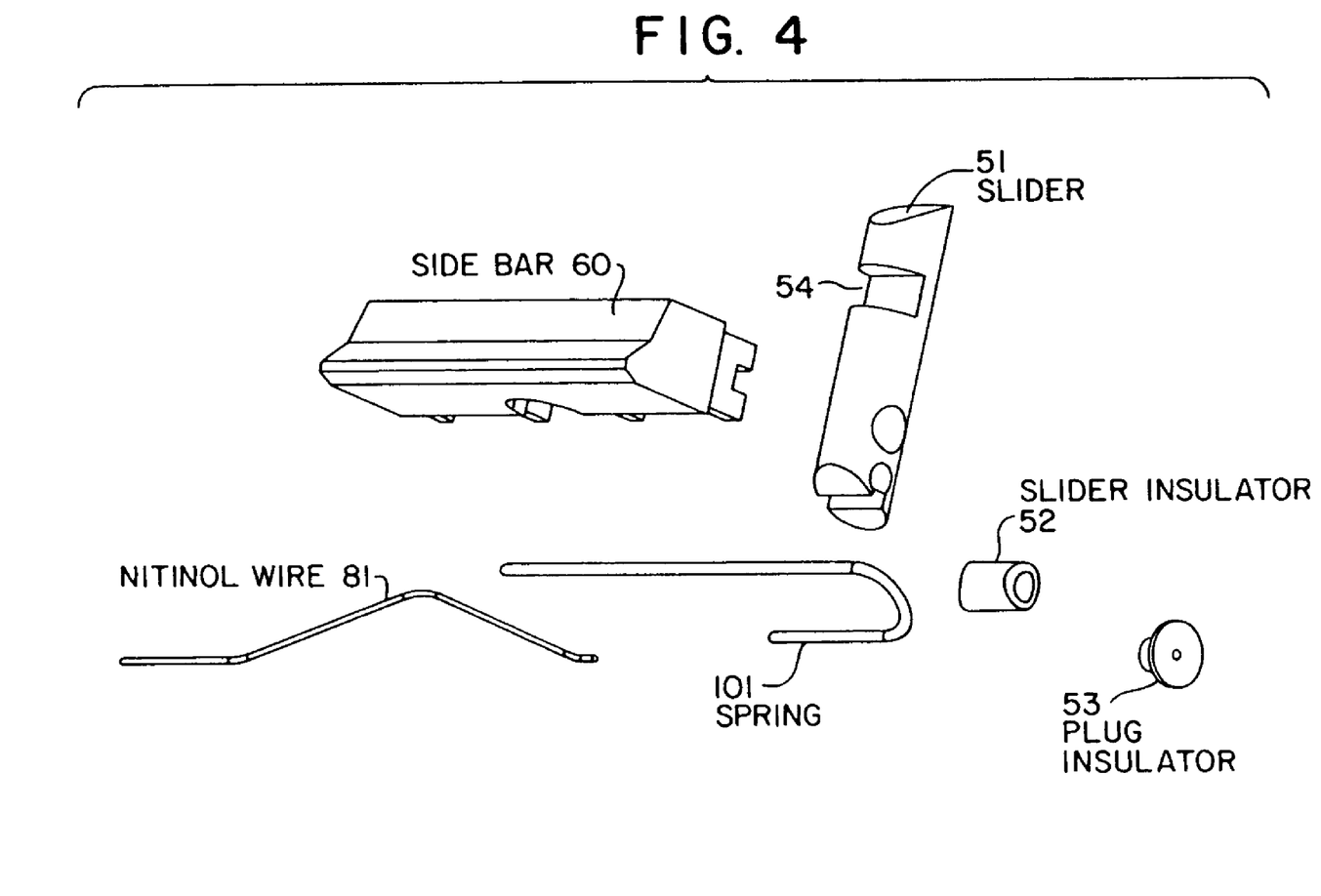
FIG. 4 is an exploded view of the side bar locking assembly according to a second embodiment of the present invention.
Figure 5A:
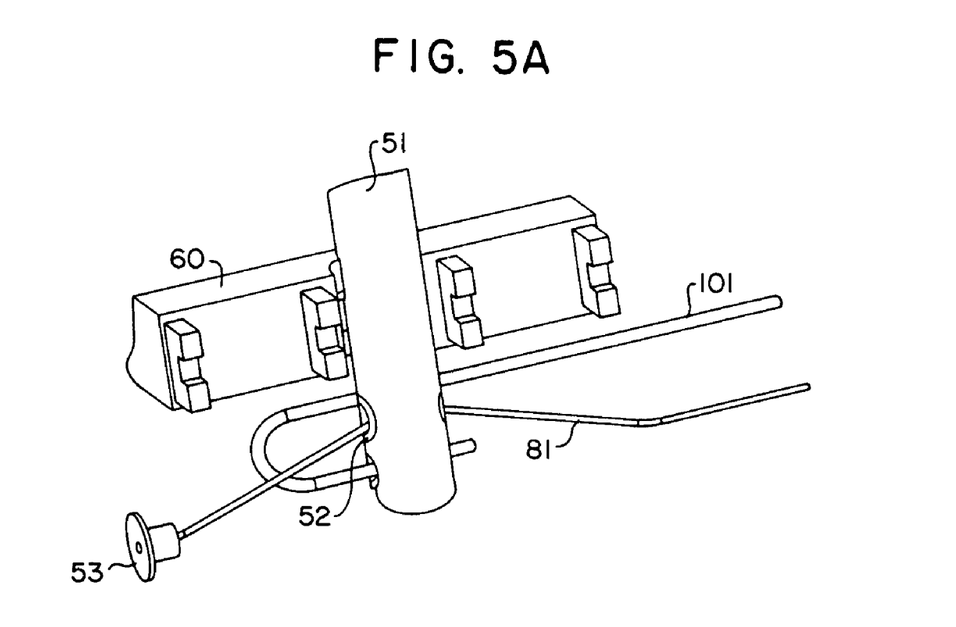
FIGS. 5A and 5B are three dimensional views of the side bar assembly according to the second embodiment of the present invention, in a locked and unlocked position, respectively.
Figure 5B:
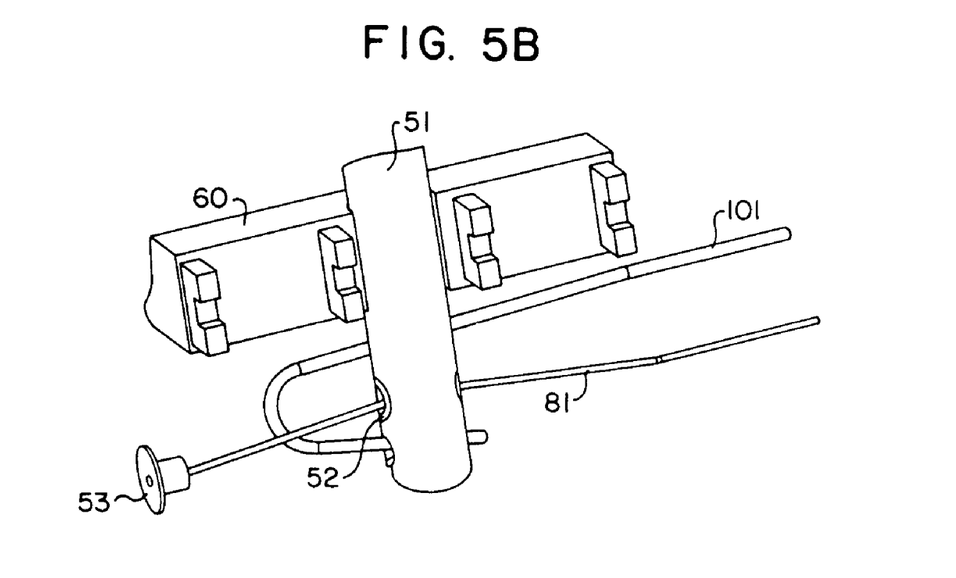

An alternative embodiment of the side bar assembly according to the present invention is shown in FIGS. 4, 5A and 5B. In this embodiment, the nitinol wire actuator 81 is used to pull a transverse slider bar 51 in a direction perpendicular to the side bar 60. A slider insulator 52 is inserted into an aperture in the slider bar 51 and the nitinol wire is threaded through the insulator 52, as show in FIGS. 5A-5B. A plug insulator 53 is attached to the end of the nitinol wire or to the plug itself. A spring 101 is inserted into another aperture in the slider bar 51 and serves to maintain slider bar 51 normally biased such that an extension on the side bar 60 (not shown in the view) is located below recess 54 in the slider bar 51, as shown in FIG. 5A. When the nitinol wire 81 is actuated, the contraction of the wire forces the slider bar 51 down against the force of the spring 101, causing the extension on the side bar to be aligned with the recess 54 as shown in FIG. 5B, thereby allowing the barrel to be rotated, camming the side bar into the barrel.

Figures 10A, 10B:
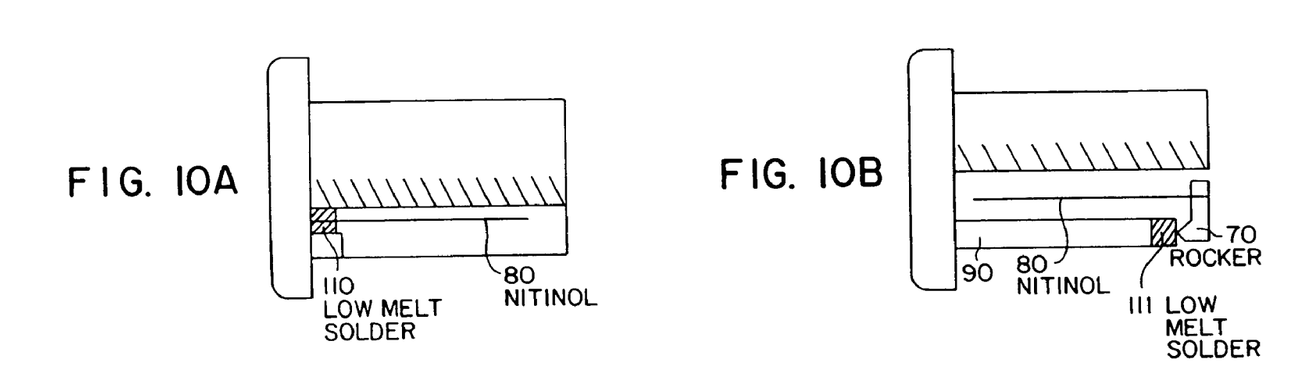
FIGS. 10-12 are views of various configurations for non-resettable thermal interlocks for the actuator device of the present invention.
Figure 11:
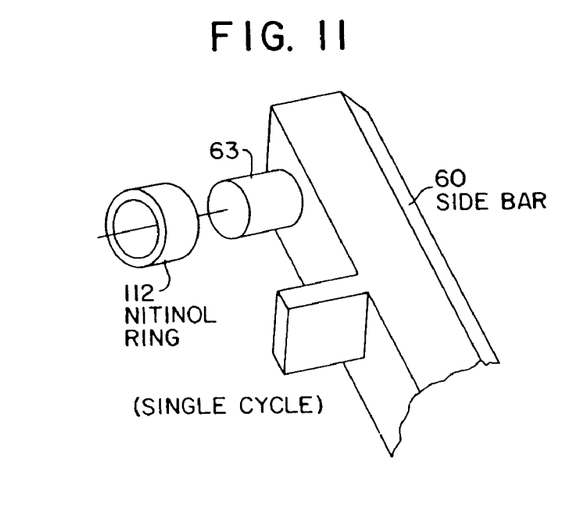
Figure 12:
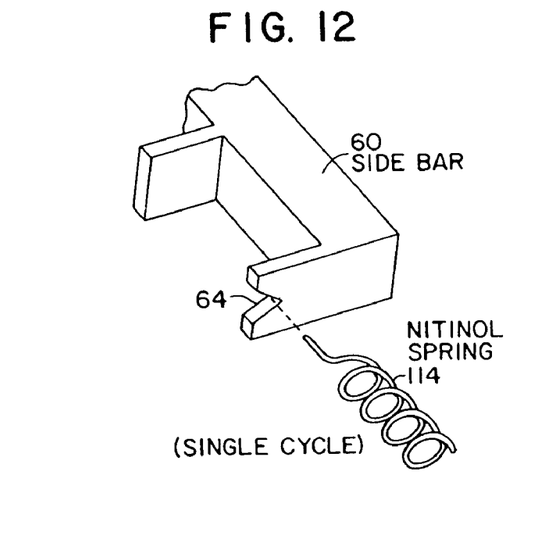

Because the shape memory alloy actuator is activated by heat, if the lock were to be heated externally it may be possible to activate the wire. Accordingly, it is necessary to provide an external heat interlock mechanism to prevent external heating of the lock from improperly activating the nitinol wire to operate the lock. FIGS. 10-12 show various non-resettable heat interlocks. As shown in FIG. 10A, a low melting temperature solder 110 connects the nitinol wire to the controller device in the barrel. FIG. 10B shows low melt solder 111 provided as a cap on the pusher 90. In the event of external heating, the solder will melt, rendering the actuator mechanism inoperable. FIG. 11 shows a nitinol ring interlock 112 which is mounted in or adjacent to the plug. The nitinol ring 112 is prestressed to have a diameter such that a post 63 provided on side bar 60 is normally able to pass into or through the ring 112 when the side bar is actuated. However, in the event that the lock is externally heated, the ring 112 will shrink and will either clamp around post 63 or block post 63 from entering into the ring, thus preventing the side bar 60 from being actuated. FIG. 12 shows a nitinol spring 114 which is prestressed in a contracted state and is mounted adjacent to a notch 64 in a leg of side bar 60. If the lock is externally heated, the spring 114 will expand into the notch 64, thereby preventing the side bar from being retracted. Ring 112 and spring 114 as shown are single cycle interlocks, in that once triggered they render the lock permanently disabled. However, it is possible to configure the ring 112 and spring 114 such that they will return to their prestressed state once they return to room temperature, thereby resetting the lock.

Figure 13A:
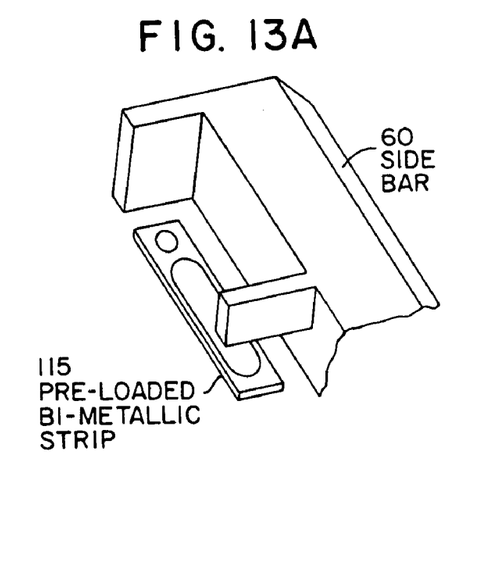
FIGS. 13-15 are view of various configurations for resettable thermal interlocks for the actuator device of the present invention.
Figure 13B:
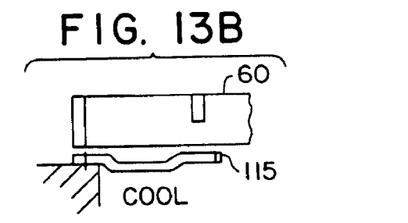
Figure 13C:
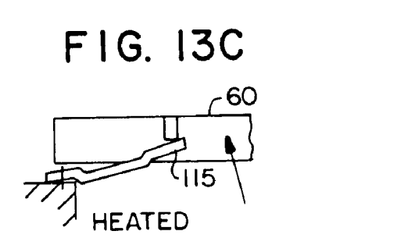
Figure 14:
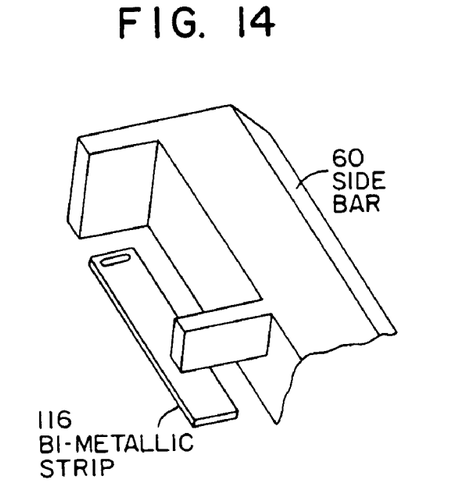
Figure 15:
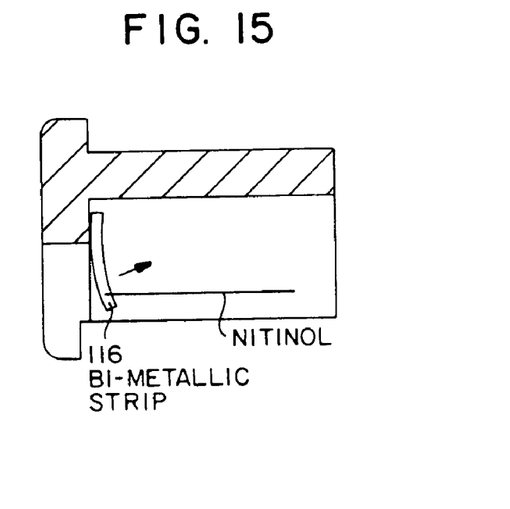

FIGS. 13-15 show resettable heat interlocks using various configurations of bimetallic strips. As shown in FIGS. 13A-13C, a preloaded bimetallic strip 115 may be provided adjacent to the side bar, which when heated will move to block the side bar, preventing movement. FIG. 13B shows the orientation of the bimetallic strip 115 relative to the side bar 60 at room temperature (viewed from inside the plug), allowing the side bar to be retracted (in a direction perpendicular to the drawing surface). FIG. 13C shows the orientation of the strip 115 when heated. In this instance, the strip 115 will flex upward into the path of the side bar 60, preventing it from being retracted (i.e., preventing the side bar from moving in the perpendicular direction out of the page). The thermal interlock shown in FIGS. 13A-13C must be externally reset once triggered. FIGS. 14 and 15 show automatically resetting bimetallic strips 116 which act in opposition to the nitinol wire when heated externally, also preventing the side bar from being moved. As soon as the bimetallic strips cool to their ambient temperature, they return to their normal positions, thus allowing the lock to be reset.

Figure 17:
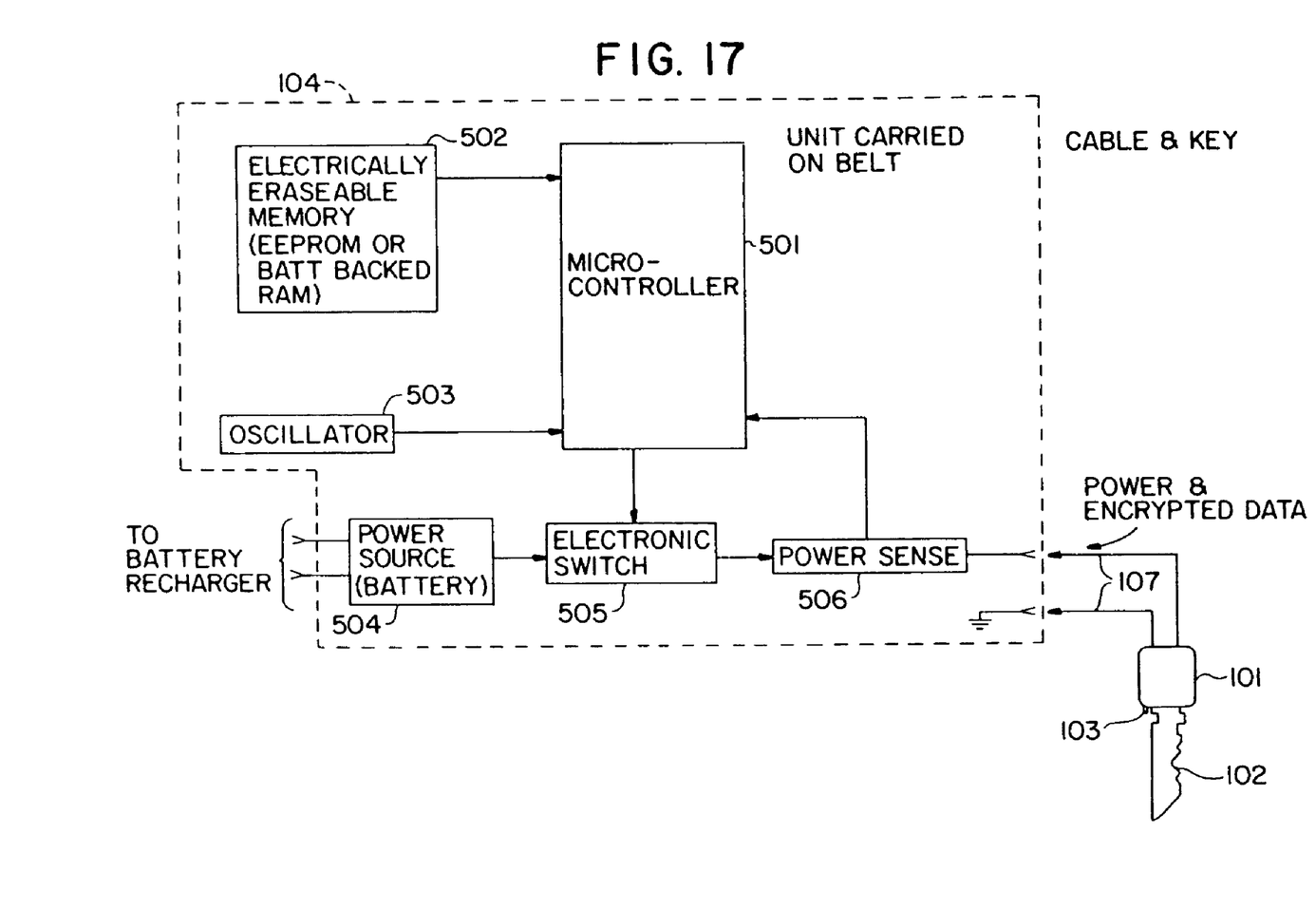
FIG. 17 is a circuit block diagram showing one embodiment of a data carrying key for use with the present invention.
Figure 18:
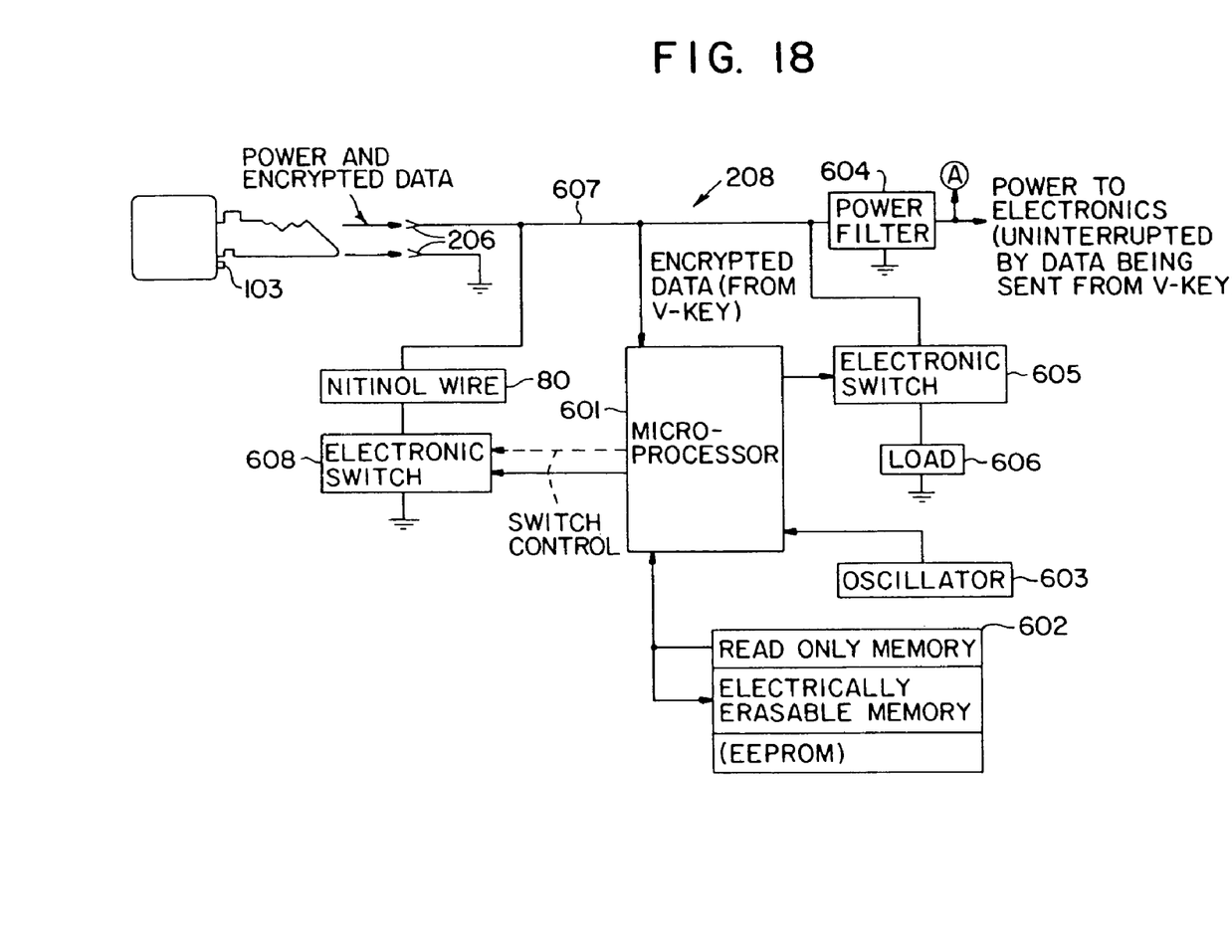
FIG. 18 is a circuit block diagram showing one embodiment of the electronics of the lock which controls activation of the shape memory alloy actuator device.

Examples of the electronic control circuitry for actuating the nitinol wire is shown in FIGS. 17 and 18. These diagrams correspond to one preferred electronic security system control as disclosed in U.S. Pat. No. 5,140,317, also incorporated by reference herein in its entirety. However, any equivalent electronic control circuit may be used without departing from the invention.

FIG. 17 is a schematic block diagram illustrating the components within an electronic key housing 104. The components include a microcontroller or microprocessor 501, an electrically erasable programmable read only memory (EEPROM) 502 coupled to the controller 501, an oscillator or clock 503 which provides clock signals for the operation of controller 501, and a battery power source 504 which operates the controller 501. The battery 504 may also be used to provide power to the circuitry within the lock. However, the lock may be provided with its own battery power source under appropriate circumstances. The electronic key components further include an electronic switch 505 operated by the controller 501 and a power sensing circuit 506.

Figure 16:
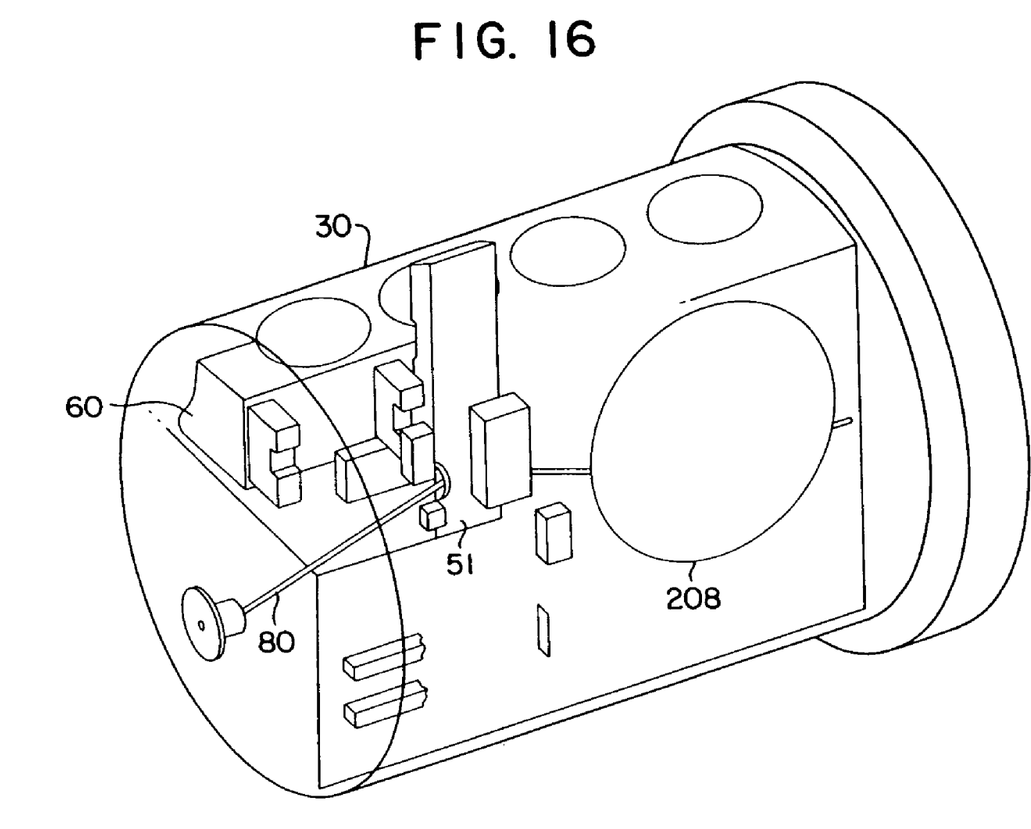
FIG. 16 is a perspective view of a cylinder barrel according to the present invention, illustrating one possible location for the controller device.

FIG. 18 is a representative schematic block diagram of electronic circuitry 208 within the lock. An example of the location of the circuitry is shown in FIG. 16. This circuitry includes a microprocessor 601, an EEPROM 602 coupled to the microprocessor 601, an oscillator or clock 603 for providing operational clock signals to the microprocessor 601, a power filter 604, electronic switch 605 and load 606 for transmission of signals to the key controller 501 via line 607, and an electronic switch 608 for allowing power to flow from power source 504 within the key housing 104 through cable 107 and contacts 103-206 through the nitinol wire 80 to ground, to activate the nitinol wire. Alternatively, the power source for the nitinol wire may be a separate battery located within the lock cylinder or cylinder barrel, or external to the cylinder.

In operation, the microprocessor 601 within the lock makes a determination as to whether the key inserted into the keyway is authorized to operate the lock, based upon a comparison of data received from the key with data stored in the memory associated with the microprocessor 601. The data used for comparison may be generated pseudorandomly by the microprocessor 601 in accordance with a stored algorithm.

In summary, the invention permits conventional mechanical locks to be retrofitted into electromechanical locks. For example, a conventional lock, which includes a plurality of tumbler pins that are both raised to a shear line and rotated to a position to accept the legs of a side bar by inserting a properly bitted key into the keyway, can be retrofitted by replacing the barrel with an electromechanical barrel constructed according to the invention. The electromechanical barrel includes a keyway with a plurality of tumbler pins and a slider bar, the slider bar being moved by a nitinol actuator mechanism so as to permit the side bar to be retracted and the lock operated. In this manner, a purely mechanical lock, which is subject to the limitations discussed above, may be retrofitted into an electromechanical lock which provides the benefits associated with utilizing an electronically controlled locking feature.

Figure 19:
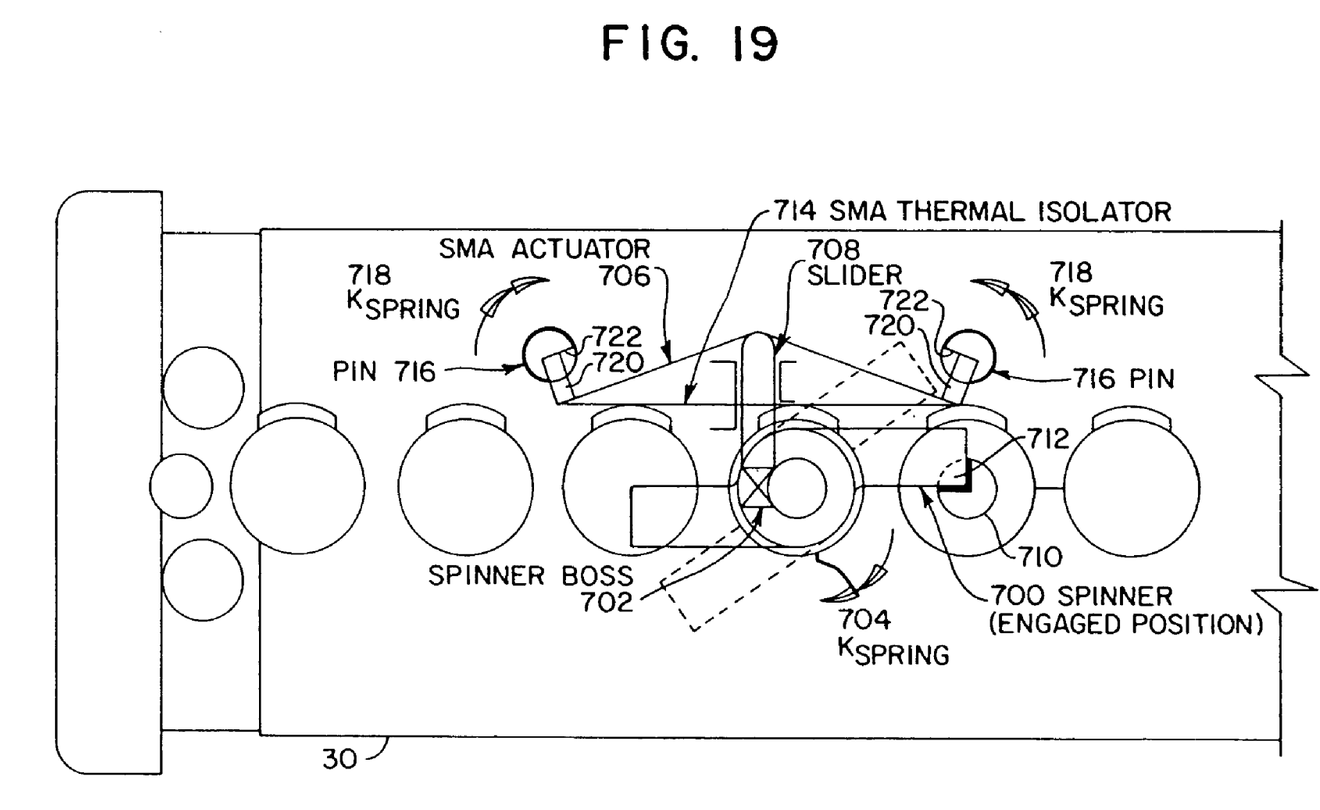
FIG. 19 is a partial phantom top view of an alternative embodiment of the invention wherein a shape memory alloy actuator device is used in conjunction with a tumbler pin blocking mechanism instead of a side bar blocking mechanism.

FIG. 19 illustrates an alternative embodiment of the present invention wherein a shape memory alloy actuator is used in conjunction with a tumbler pin blocking mechanism. According to this embodiment, a spinner 700 which engages a notch 712 in a tumbler pin 710 is provided in the plug 30. The spinner 700 is biased into the notch 712 by a spring force 704. A shape memory alloy actuator 706 is provided to actuate a slider 708 which engages a boss 702 on the spinner 700.

In operation, at least one tumbler pin 710 is blocked or locked into the "up" position (i.e., through the shear line) by the spinner 700 being engaged in the notch 712. Upon insertion of an authorized key and successful transfer of data to the control device, the shape memory alloy actuator 706 is heated by passing a current therethrough, causing the actuator to contract. The contraction of the actuator 706 causes it to force the slider 708 against the spinner boss 702 in opposition to and overcoming the spring force 704. This causes the spinner 700 to rotate to the position shown in phantom in FIG. 19, disengaging it from the tumbler pin 710, and allowing the tumbler pin to fall and seat against the bitting of the inserted key. If the key bittings match the tumbler pin codes, the key will be able to rotate the plug and open the lock. When the actuator 706 cools, the spring force 704 will again bias it against the tumbler pin 710, such that as the key is removed from the plug, the pin will be raised by the retreating bitting surface of the key, causing the notch 712 to align with the spinner 710. As the notch 712 lines up with the spinner 710, the spring force 704 causes the spinner to engage the notch and again block the pin in an upward position within the plug.

The embodiment of FIG. 19 also includes thermal interlock protection. The ends of the shape memory alloy actuator 706 are anchored to bosses 720 extending from notches 722 of rotating pins 716. The pins 716 are biased by spring forces 718 to keep the actuator 706 taut against the slider. A shape memory alloy thermal interlock actuator 714 is also anchored to the bosses 720. The actuator 706 is made of a high transition temperature, low force wire, while the thermal actuator 714 is made of a low transition temperature, high force wire.

In the event that the lock is heated externally, the thermal interlock actuator 714 will contract, pulling in the bosses 720 against the spring forces 718 and creating slack in the actuator 706. Subsequent activation of the actuator wire 706 will thus merely absorb the imposed slack, preventing the actuator 706 from exerting enough force to move the slider 708 so as to disengage the spinner 700. The thermal interlock is automatically resettable, in that as the plug cools, the thermal actuator 714 will stretch back to its normal shape, allowing the spring forces 718 to rotate the pins 716 to remove the slack in the actuator 706.

Those skilled in the art will recognize the many advantages and great flexibility provided by the present invention. It should be recognized that the preferred embodiments discussed above have been described in detail so as to provide a full and complete disclosure thereof, and are only exemplary of the many possible variations and applications of the teachings of the present invention.

What is claimed is:

1. An electromechanical lock cylinder, comprising:
an outer shell having a bore formed therein and a cavity extending from the bore into the shell;
a barrel disposed within the bore in the shell and being rotatable relative thereto;
a side bar cooperating between the shell and the barrel for selectively permitting and blocking rotation of the barrel with respect to the shell, the side bar having a first portion engaging the barrel and a second portion removably received in the cavity in the shell, the side bar being movable relative to the barrel and the shell;
a blocking mechanism positionable in a blocking position relative to the side bar, which position blocks motion of the side bar with respect to the shell, and thereby prevents rotation of said barrel, and also positionable in an unblocking position relative to the side bar, which permits the side bar to be moved relative to the cavity in the shell to allow the barrel to be rotated with respect to the shell;
an electrically activated drive mechanism cooperating with the blocking mechanism to selectively move the blocking mechanism from the blocking position to the unblocking position in which the side bar moves out of the cavity upon rotation of the barrel; and
control means for activating the electrically activated drive mechanism in response to an authorized attempt to operate the lock cylinder,
wherein said blocking mechanism comprises a slider bar movable relative to the side bar, wherein in said unblocking position said slider bar is positioned adjacent to a recess, located in said side bar for receiving said slider bar, upon rotation of said barrel.

2. A lock cylinder according to claim 1, wherein said electrically activated drive mechanism comprises a shape memory alloy actuator for moving said slider bar to said unblocking position upon activation by passing electric current through said actuator.

3. A lock cylinder according to claim 2, wherein said electrically activated drive mechanism further comprises a rocker attached to said shape memory alloy actuator and a pusher coupled between said rocker and said slider bar.

4. A lock cylinder according to claim 2, wherein said electrically activated drive mechanism further comprises a spring applying a force to said slider bar for biasing said slider bar in said blocking position when said shape memory alloy actuator is not activated.

5. A lock cylinder according to claim 2, wherein said shape memory alloy actuator is in the form of a wire.

6. A lock cylinder according to claim 2, wherein said shape memory alloy actuator is made of nitinol.

7. An electromechanical lock cylinder, comprising:
an outer shell having a bore formed therein and a cavity extending from the bore into the shell;
a barrel disposed within the bore in the shell and being rotatable relative thereto;
a blocking mechanism for normally blocking rotation of said barrel and being movable to an unblocking position to permit rotation of said barrel;
means cooperating with the blocking mechanism for selectively moving the blocking mechanism from the blocking position to the unblocking position upon occurrence of a predetermined condition, said moving means comprising a shape memory alloy actuator activated by passing electrical current therethrough; and
a side bar cooperating between the shell and the barrel for selectively permitting and blocking rotation of the barrel with respect to the shell, the side bar having a first portion engaging the barrel and a second portion removably received in the cavity in the shell, the side bar being movable relative to the barrel and the shell;

said blocking mechanism including a slider bar movable relative to the side bar, wherein in said unblocking position a recess in said slider bar is positioned adjacent to an extension in said side bar for receiving said extension upon rotation of said barrel.

8. An electromechanical lock cylinder, comprising:

an outer shell having a bore formed therein and a cavity extending from the bore into the shell;

a barrel disposed within the bore in the shell and being rotatable relative thereto;

a blocking mechanism for normally blocking rotation of said barrel and being movable to an unblocking position to permit rotation of said barrel;

means cooperating with the blocking mechanism for selectively moving the blocking mechanism from the blocking position to the unblocking position upon occurrence of a predetermined condition, said moving means comprising a shape memory alloy actuator activated by passing electrical current therethrough; and a side bar cooperating between the shell and the barrel for selectively permitting and blocking rotation of the barrel with respect to the shell, the side bar having a first portion engaging the barrel and a second portion removably received in the cavity in the shell, the side bar being movable relative to the barrel and the shell;

said blocking mechanism including a slider bar movable relative to the side bar, wherein said slider bar is positioned adjacent to a recess, located in said side bar for receiving said slider bar, upon rotation of said barrel.

9. A lock cylinder according to claim 8, wherein said blocking mechanism further comprises a rocker attached to said shape memory alloy actuator and a pusher coupled between said rocker and said slider bar.

10. A lock cylinder according to claim 7, further comprising control means, responsive to electrical data input from a key inserted into said lock cylinder, for causing said electrical current to be passed through said shape memory alloy actuator.

11. A lock cylinder according to claim 7, wherein said shape memory alloy actuator comprises a nitinol wire.

12. A lock cylinder according to claim 7, further comprising thermal interlock means for preventing operation of the lock cylinder upon external heating of said lock cylinder.

13. A lock cylinder according to claim 7, further comprising a plurality of tumbler pins cooperating between the shell and the barrel so as to block rotation of the barrel with respect to the shell in the absence of a properly bitted key, and to allow rotation of the barrel with respect to the shell upon insertion of a properly bitted key;

said blocking mechanism comprising a spinner which retractably engages at least one of said plurality of tumbler pins to prevent said at least one tumbler from moving to allow rotation of said barrel, said shape memory alloy actuator being activated to retract said spinner from engagement with said at least one tumbler pin.

14. An electromechanical lock cylinder, comprising:

an outer shell having a bore formed therein and a cavity extending from the bore into the shell;

a barrel disposed within the bore in the shell and being rotatable relative thereto;

a blocking mechanism located in said barrel for normally blocking rotation of said barrel and being movable to an unblocking position to permit rotation of said barrel; and electronic control means located at least in said lock cylinder cooperating with the blocking mechanism to selectively move the blocking mechanism from the blocking position to the unblocking position upon occurrence of a predetermined condition; and a nitinol wire actuator cooperating with said electronic control means and said blocking mechanism for causing said blocking mechanism to move to said unblocking position upon passing of current through said wire, under control of said control means; and a side bar cooperating between the shell and the barrel for selectively permitting and blocking rotation of the barrel with respect to the shell, the side bar having a first portion engaging the barrel and a second portion removably received in the cavity in the shell, the side bar being movable relative to the barrel and the shell;

said blocking mechanism including a slider bar movable relative to the side bar, wherein in said unblocking position a recess in said slider bar is positioned adjacent to an extension in said side bar for receiving said extension upon rotation of said barrel.

15. An electromechanical lock cylinder, comprising:

an outer shell having a bore formed therein and a cavity extending from the bore into the shell;

a barrel disposed within the bore in the shell and being rotatable relative thereto;

a blocking mechanism located in said barrel for normally blocking rotation of said barrel and being movable to an unblocking position to permit rotation of said barrel;

electronic control means located at least in said lock cylinder cooperating with the blocking mechanism to selectively move the blocking mechanism from the blocking position to the unblocking position upon occurrence of a predetermined condition;

a nitinol wire actuator cooperating with said electronic control means and said blocking mechanism for causing said blocking mechanism to move to said unblocking position upon passing of current through said wire, under control of said control means; and a side bar cooperating between the shell and the barrel for selectively permitting and blocking rotation of the barrel with respect to the shell, the side bar having a first portion engaging the barrel and a second portion removably received in the cavity in the shell, the side bar being movable relative to the barrel and the shell;

said blocking mechanism including a slider bar movable relative to the side bar, wherein said slider bar is positioned adjacent to a recess, located in said side bar, for receiving said slider bar upon rotation of said barrel.

16. lock cylinder according to claim 15, wherein said blocking mechanism further comprises a rocker attached to said nitinol wire actuator and a pusher coupled between said rocker and said slider bar.

* * * * *